(12) United States Patent
Ruehle et al.

(10) Patent No.: US 6,901,354 B2
(45) Date of Patent: *May 31, 2005

(54) METHOD AND APPARATUS FOR COMMAND PERCEPTION BY DATA VALUE SEQUENCING, ALLOWING FINITE AMOUNT OF UNRELATED INTERIM DATA

(75) Inventors: Michael Darryl Ruehle, Santa Clara, CA (US); Jason E. Cosky, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 09/966,824

(22) Filed: Sep. 27, 2001

(65) Prior Publication Data

US 2003/0061454 A1 Mar. 27, 2003

(51) Int. Cl.[7] .......................... G06F 13/00; G06F 15/00
(52) U.S. Cl. ........................ 702/190; 713/190
(58) Field of Search .............................. 380/264, 267; 713/190, 193; 710/15, 16, 5; 702/190

(56) References Cited

U.S. PATENT DOCUMENTS

| | | | | |
|---|---|---|---|---|
| 3,629,847 A | * | 12/1971 | Adlhoch | 340/825.26 |
| 3,760,355 A | * | 9/1973 | Bruckert | 708/212 |
| 4,060,797 A | * | 11/1977 | Maxwell et al. | 341/106 |
| 4,388,695 A | | 6/1983 | Heinemann | 364/900 |
| 4,627,074 A | * | 12/1986 | Markwitz et al. | 380/267 |
| 4,727,558 A | * | 2/1988 | Hall | 375/368 |
| 4,754,420 A | * | 6/1988 | Jensen | 708/300 |
| 5,051,947 A | | 9/1991 | Messenger et al. | 364/900 |
| 5,109,333 A | | 4/1992 | Kubota et al. | 395/275 |
| 5,237,616 A | | 8/1993 | Abraham et al. | 380/49 |
| 5,249,232 A | * | 9/1993 | Erbes et al. | 713/190 |
| 5,377,264 A | * | 12/1994 | Lee et al. | 713/189 |
| 5,392,316 A | * | 2/1995 | Sawaguchi et al. | 375/290 |
| 5,408,678 A | * | 4/1995 | Kato et al. | 710/60 |
| 5,491,698 A | * | 2/1996 | Patel et al. | 714/709 |
| 5,590,159 A | * | 12/1996 | Anderson | 375/340 |
| 6,061,449 A | * | 5/2000 | Candelore et al. | 380/28 |
| 6,092,193 A | * | 7/2000 | Loomis et al. | 713/193 |
| 6,155,310 A | | 12/2000 | Haubert et al. | |
| 6,249,896 B1 | | 6/2001 | Ho et al. | 714/814 |
| 6,522,694 B1 | * | 2/2003 | Ryan | 375/240.25 |

OTHER PUBLICATIONS

Emeka Mosanya et al., "CryptoBooster: A Reconfigurable and Modular Cryptographic Coprocessor", First International Workshop, Worcester, MA, Aug. 12–13, 1999, pp. 246–256.

* cited by examiner

Primary Examiner—Kim Huynh
(74) Attorney, Agent, or Firm—Kenyon & Kenyon

(57) ABSTRACT

A system and method for peripheral control. The present invention relates to utilizing device address call sequencing for control of active memory bus peripheral devices, allowing for a pre-defined amount of spurious data between terms in the sequence.

30 Claims, 6 Drawing Sheets

Operational Flowchart

General Schematic of Data Value Sequence Detector

METHOD AND APPARATUS FOR COMMAND PERCEPTION BY DATA VALUE SEQUENCING, ALLOWING FINITE AMOUNT OF UNRELATED INTERIM DATA

BACKGROUND INFORMATION

The present invention relates to peripheral control. More specifically, the present invention relates to utilizing separate device address call sequencing for control of memory bus peripheral devices, allowing for spurious data between values in the sequence.

In a continuing quest for increased computer speed and efficiency, designers sometimes utilize purpose-specific devices to handle activities for which the devices can be specifically engineered. For example, video cards (graphics accelerators) are often utilized to improve a computer system's ability to display video images without sacrificing overall computer performance. They free up a computer's central processing unit (CPU) to execute other commands while the video card is handling graphics computations.

Another example has to do with purpose-specific devices for encryption and decryption. As more and more information is communicated via the Internet, security concerns have become increasingly prevalent. Encryption techniques are used in the art to prevent the unauthorized interception of data transferred across the Internet. An example of a common protocol for data encryption is the Security Sockets Layer (SSL) (SSL 2.0, revised Feb. 9, 1995). When an SSL session is initiated, the server forwards its 'public' key to the user's browser, which the browser uses to send a randomly-generated 'secret' key back to the server to have a secret key exchange for that session. Developed by Netscape Corporation, SSL has been merged with other protocols and authentication methods by the Internet Engineering Task Force (IETF) into a new protocol known as Transport Layer Security (TLS) (TLS 1.0 revised 1999).

Encryption/decryption protocols, such as is used in SSL, are very computationally intensive. The process of encoding and decoding information can rob a great deal of a central processing unit's (CPU) valuable processing resources. In addition to encryption/decryption and video processing, other activities that involve computationally intensive and repetitive processes benefit from purpose-specific peripheral processing.

In providing a purpose-specific device on a memory bus (a memory bus peripheral), such as for encryption/decryption, the device needs to be active and further, be able to receive commands from the CPU. It is therefore desirable to have a system that relieves a CPU of a share of responsibility for computationally intensive activities by providing a dedicated, active memory bus peripheral. It is further desirable to improve communication between the CPU and the dedicated, active memory bus peripheral.

DETAILED DESCRIPTION

Figure 1:
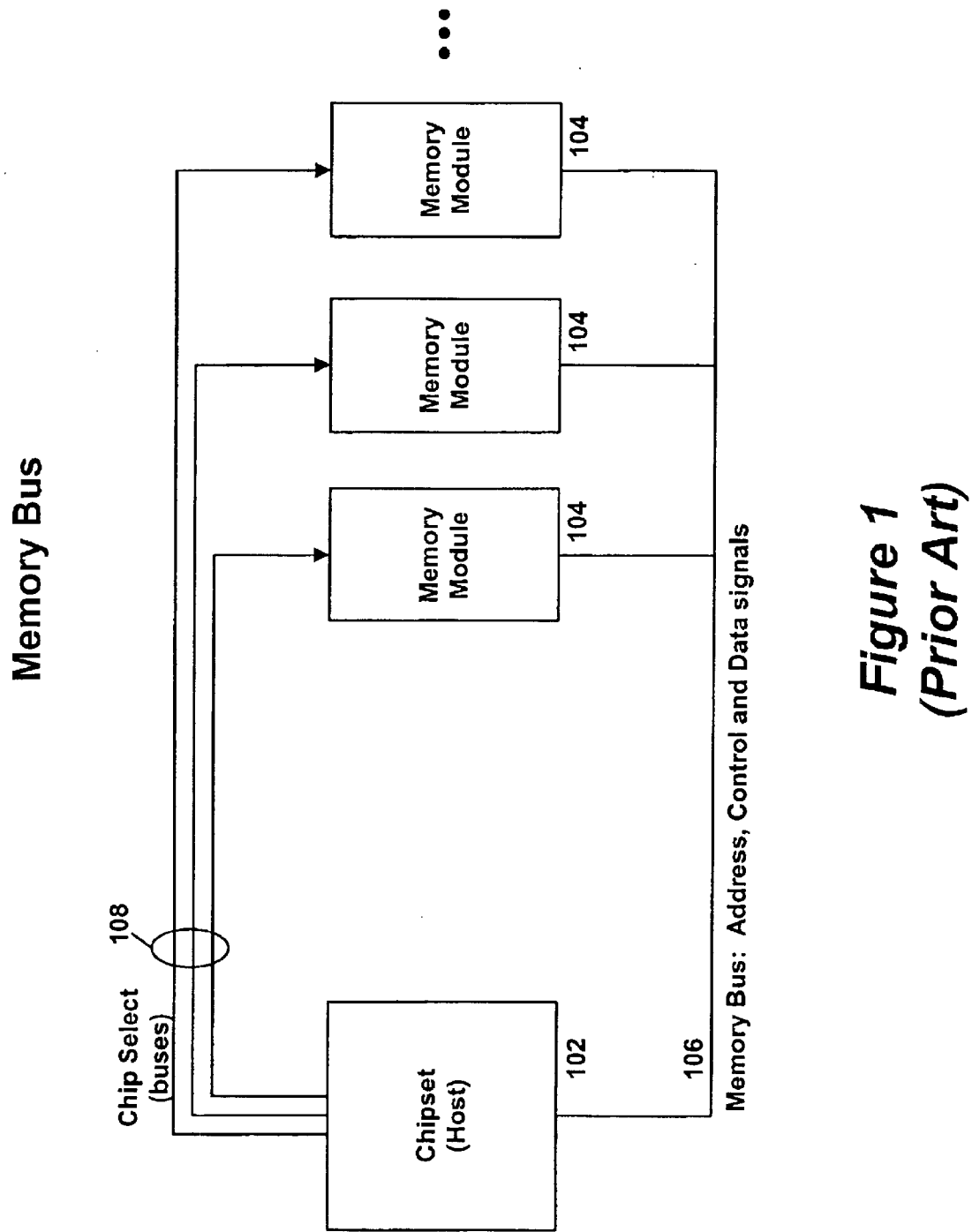
FIG. 1 provides an illustration of a typical memory bus in the art.

FIG. 1 provides an illustration of a typical memory bus in the art. A microprocessor chipset 102 (the host) utilizes one or more memory modules 104, e.g. Dual In-line Memory Modules (DIMM). The host 102 typically communicates with the memory modules via a common memory bus. In other words, each memory module sees all address, control, and data signals being communicated on the memory bus 106. The host is able to define which memory module is intended for receipt of a message through utilization of a series of 'chip select' lines (buses) 108. In FIG. 1, a series of chip select 'buses' 108 is provided. In a DIMM, for example, each chip select bus 108 would provide a chip select to the front of the module and one to the backside of the module. Each chip select line 108 is associated to a specific memory module 108. The chip select line 108 asserted provides which memory module is to receive the data currently communicated on the memory bus 106.

Figure 2:
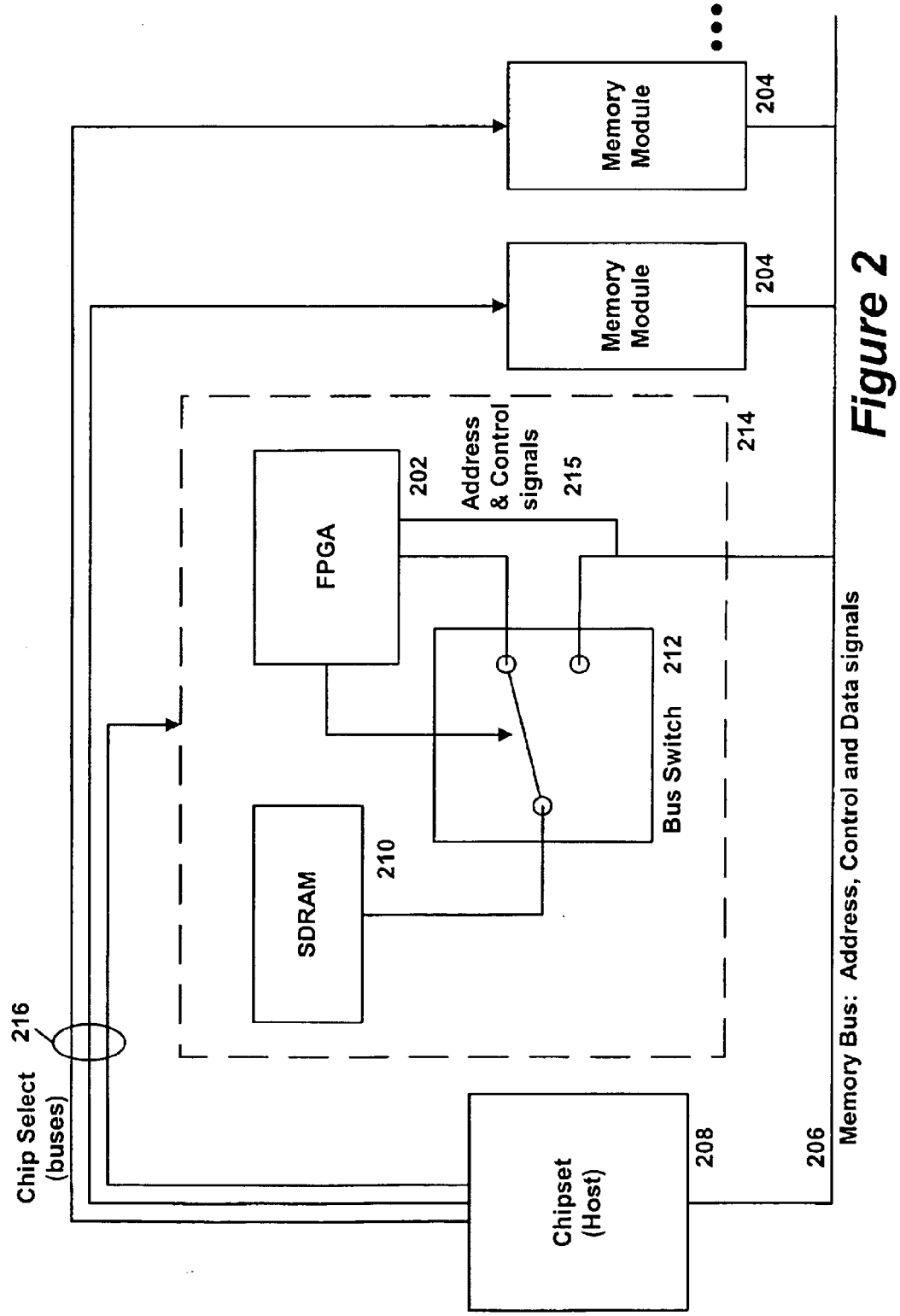
FIG. 2 illustrates the operation of an active memory bus peripheral under principles of the present invention.

FIG. 2 illustrates the operation of an active memory bus peripheral under principles of the present invention. In one embodiment of the present invention, a Field Programmable Gate Array 202 (FPGA), is utilized for accelerating various computationally intensive tasks (such as encryption and decryption). The FPGA 202 is configured for optimal performance of the repetitive computations associated with its purpose (encryption/decryption, etc.) through parallel processing units, etc. In one embodiment, the FPGA 202 is located in a DIMM slot on a PC-100 (Registered DIMM Design Specification (Revision 1.2)) or PC-133 (Registered DIMM Design Specification (Revision 1.1)) memory bus 206. In one embodiment, on-board SDRAM (Synchronous Dynamic Random Access Memory) 210 is shared between the host computer 208, which perceives it as normal memory (e.g. similar to memory module 204), and the FPGA 202, by switching, through bus switch 212, the address/data/control connections to the on-board SDRAM 210 between the host 208 and the FPGA 202. In one embodiment, at any given time, either the host 208 or the FPGA 202 has access to the on-board SDRAM 210. Switching, by the bus switch 212, of this on-board SDRAM 210 bus is requested by the host machine 208 but controlled directly by the FPGA 202. In one embodiment, the host 208 must be able to send the FPGA 202 two commands: "Switch the SDRAM bus to the host" and "Switch the SDRAM bus to the FPGA." Using the host's perspective, these can be called 'Get Bus' and 'Put Bus,' respectively.

In one embodiment, a signal tap 215 is utilized to link the FPGA 202 to the address and control signals, as well as the apparatus' 214 chip select, on the host's memory bus 206, regardless of to which device the on-board SDRAM bus switch 212 is connected, so that it can monitor the values driven by the host 208. In one embodiment, due to size restrictions, the FPGA 202 does not have enough pins to monitor the data lines. Hence, the data signals are not monitored.

A potential means of sending the 'Get Bus' command is to have the host 208 read from or write to one of two respective trigger addresses in the on-board SDRAM's 210 memory. By monitoring address and control signals the FPGA 202 could detect when the trigger address for the 'Get Bus' command is accessed, and switch the bus accordingly. However, on systems employing Error Correction Code (ECC) memory, this could potentially cause a problem. When the host 208 issues a 'Get Bus' command, it is presumably not connected to the on-board SDRAM's 210 memory. If the chipset 208 attempts to read from the on-board SDRAM's 210 memory, it will read invalid data or 'garbage'—whatever values happen to lie on the memory bus's 206 data and parity lines as a result of previously driven values (capacitance and charge leakage)—and this may generate an ECC error, with possibly terminal consequences. The system may decide that the memory (the apparatus 214) is defective and shut down communication to it entirely. On some systems, even a write requested by the central processing unit (CPU) may generate a read by the chipset 208, e.g. the chipset 208 reads from several locations, modifies some of the data as requested, then writes it all back. The ECC may, therefore, detect a false error and problems may result.

Because of these potential problems, it may be necessary to trigger the bus switch 212 through an alternate means. In one embodiment, rather than writing to the on-board SDRAM's memory 210 to trigger a 'Get Bus,' the host 208 writes to memory on another DIMM 204 on the system's memory bus 206, and the FPGA 202 detects this by monitoring the memory bus' 206 address signals, which are shared among the chipset 208, the apparatus 214 (SDRAM 210, bus switch 212 and FPGA 202) and other DIMM's (memory modules) 204. In one embodiment, since chip-select signals 216 are not shared among the various DIMM's 214, 204 (generally), the apparatus 214 cannot tell which memory module 204 (or which side of that module) other than itself 214 is being accessed. Also, since the precise usage of the memory bus address lines to select rows, banks, and columns vary from memory module 204 to memory module 204, the apparatus 214 may not be able to tell precisely what offset into a memory module 204 (from the beginning of the reserved 2 KB, explained below) is being accessed. In one embodiment, what may be relied on is the usage of the 8 least significant bus address lines as the eight least significant column address bits. In one embodiment, with 64-bit data words, the apparatus 214 can tell what physical address is being accessed modulo 2 KB. It can tell, e.g., that an access was to a physical address 2048*N+1224 bytes, for some unknown value N. In this example, the apparatus's 214 information is the offset of 1224 bytes, or 153 64-bit locations. This provides for only 8 bits of information. If the FPGA 202 executes a 'Get Bus' request every time a certain offset into 2 KB (the reserved area of memory) is seen, it may do so at frequent, unintended times, triggered not only by intentional 'Get Bus' commands, but also by unrelated memory accesses by the operating system or software applications. In one embodiment, to minimize such accidental 'Get Bus' switches, the amount of information in the command is increased by writing not just to a single address, but to a sequence of addresses. In one embodiment, by choosing the sequence carefully and to be sufficiently long, it can be made unlikely that the chipset 208 will randomly perform memory accesses matching the sequence.

In one embodiment, it is not necessary to utilize a sequence of address calls for the 'put bus' command. Because the host 208 is connected to the apparatus' SDRAM 210 at the time of a 'put bus' command, there is no problem writing to a single trigger address on the apparatus' SDRAM 210. After such a command, the FPGA 202 switches the bus to itself.

In one embodiment, it is likely that one or more data values, which are not part of the command sequence, ('non-relevant' values) may appear on the memory bus 206 between command sequence ('relevant') values. This is due to the fact that the memory bus 206 may be used for other operations simultaneously. In one embodiment, each memory access by the chipset 102—whether generated by a CPU, a peripheral Direct Memory Access (DMA) operation, or the chipset 102 itself—results in some 8-bit value in the least significant 8 address bits, and several accesses such as this may potentially happen while the apparatus is attempting to send a 'Get Bus' command sequence, thus introducing spurious 8-bit values between successive terms of the command sequence. In one embodiment, if the FPGA 202 ever misses a 'Get Bus' command it could cause a large problem, as the apparatus may then perform many memory operations targeted to the apparatus' SDRAM 210 at a time when the host 208 is not connected to that SDRAM 210. On the other hand, if the FPGA 202 switches the SDRAM 210 bus to the host 208 erroneously, thinking it saw the 'Get Bus' sequence although it was never sent, the only consequence is some loss of performance, because eventually the 'Get Bus' command will be sent, and thereafter things will be back to normal. Therefore, in one embodiment it may be better to err on the side of allowing too may interim spurious data values.

Figure 3:
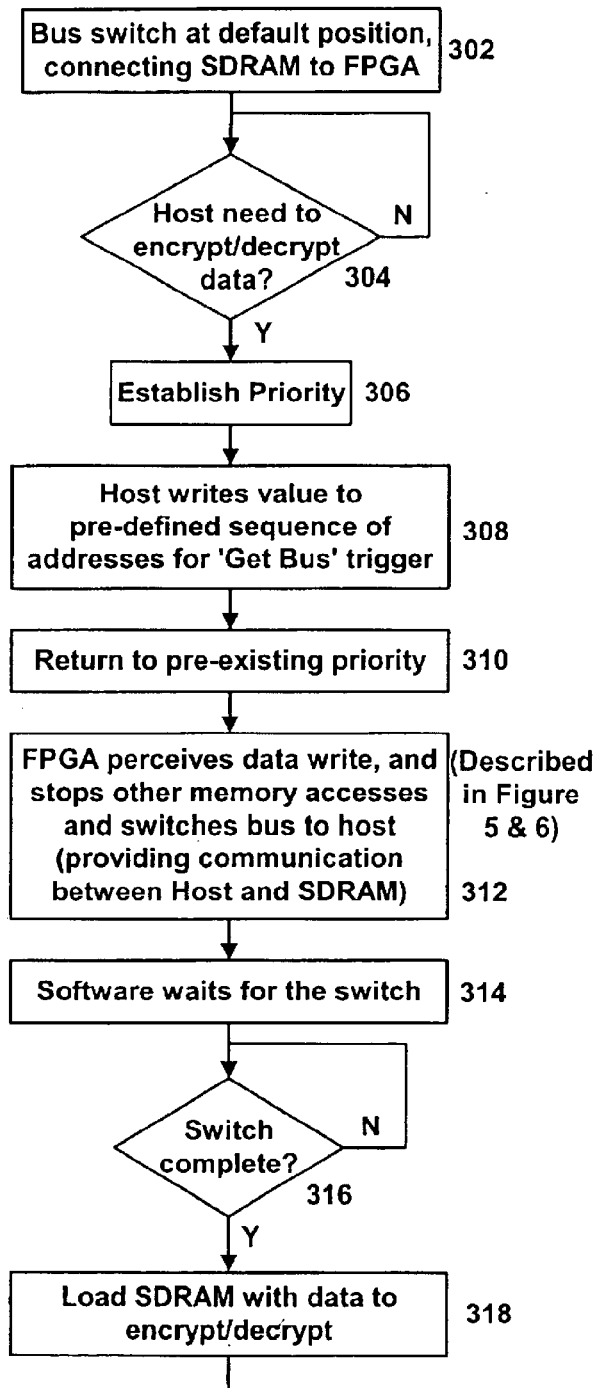
FIG. 3 provides a flowchart representative of the process of bus switching for a dynamic bus peripheral under principles of the present invention.
Figure 3:
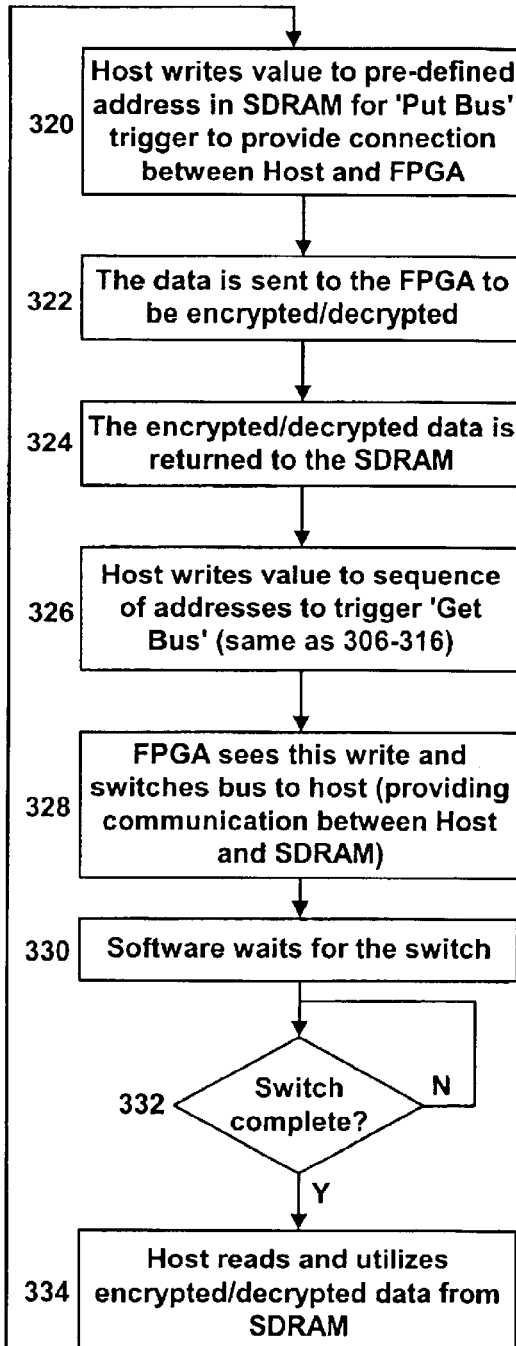

FIG. 3 provides a flowchart representative of the process of bus switching for a dynamic bus peripheral under principles of the present invention. In one embodiment of the present invention, the bus switch is found at the default position 302, which provides communication between the on-board SDRAM and the FPGA. In one embodiment, when the host wants access to the apparatus' memory 304 (for encryption/decryption, etc.), it would 'spin-lock' the system (e.g., cause an indefinite loop), disable as many interrupts as possible, and establish as exclusive of access to memory and as uninterruptible an execution priority as possible 306. In one embodiment, the host writes, as rapidly as possible, to a predetermined sequence of addresses in the reserved 2 KB 308. Since the addresses seen by the apparatus are based on 64-bit data words, each address in the sequence is offset by a different multiple of 8 bytes. In one embodiment, a valid sequence of 8 offsets is as follows: 1208, 464, 1736, 1056, 408, 1840, 1256, and 704 bytes. In one embodiment, for the FPGA to detect the 'Get Bus' command sequence, the eight least significant address lines from the system's memory bus are monitored on each appropriate clock edge. In one embodiment, these eight bits are compared to the command sequence values determined by dividing the byte offsets used by the host by eight. For the sequence provided above, these values are 151, 58, 217, 132, 51, 230, 157, and 88. In one embodiment, the portion of the command sequence previously seen is monitored and the switch is made to the host when the whole sequence has been perceived.

In one embodiment, the 'spin-lock' is then removed and the interrupts are once again enabled 310. In one embodiment, the system waits some period of time that allows the FPGA to detect the command sequence 312 and switch 314 the SDRAM bus to the host 316. In one embodiment this time period is about 5 microseconds. The process of address call sequence perception is explained further below and in FIGS. 5 and 6.

In one embodiment, the on-board SDRAM is next loaded by the host with data to encrypt/decrypt (or for whatever purpose) 318. In one embodiment, the host then makes a predefined sequence of address calls to trigger a 'Put Bus' 320. The data is then forwarded to the FPGA so that the computational activity (such as encryption/decryption) can be performed 322. In one embodiment, after the activity, the encrypted/decrypted, etc. data is returned to the SDRAM to be held 324. The host then triggers a 'Get Bus' by the appropriate sequential address call 326 (same as done previously 306–316). In one embodiment the FPGA perceives this sequential address call and switches the bus to the host 328. In one embodiment, after waiting for the switch to occur 330,332, the host reads and utilizes the altered (encrypted/decrypted, etc.) data from the SDRAM 334.

Figure 4:
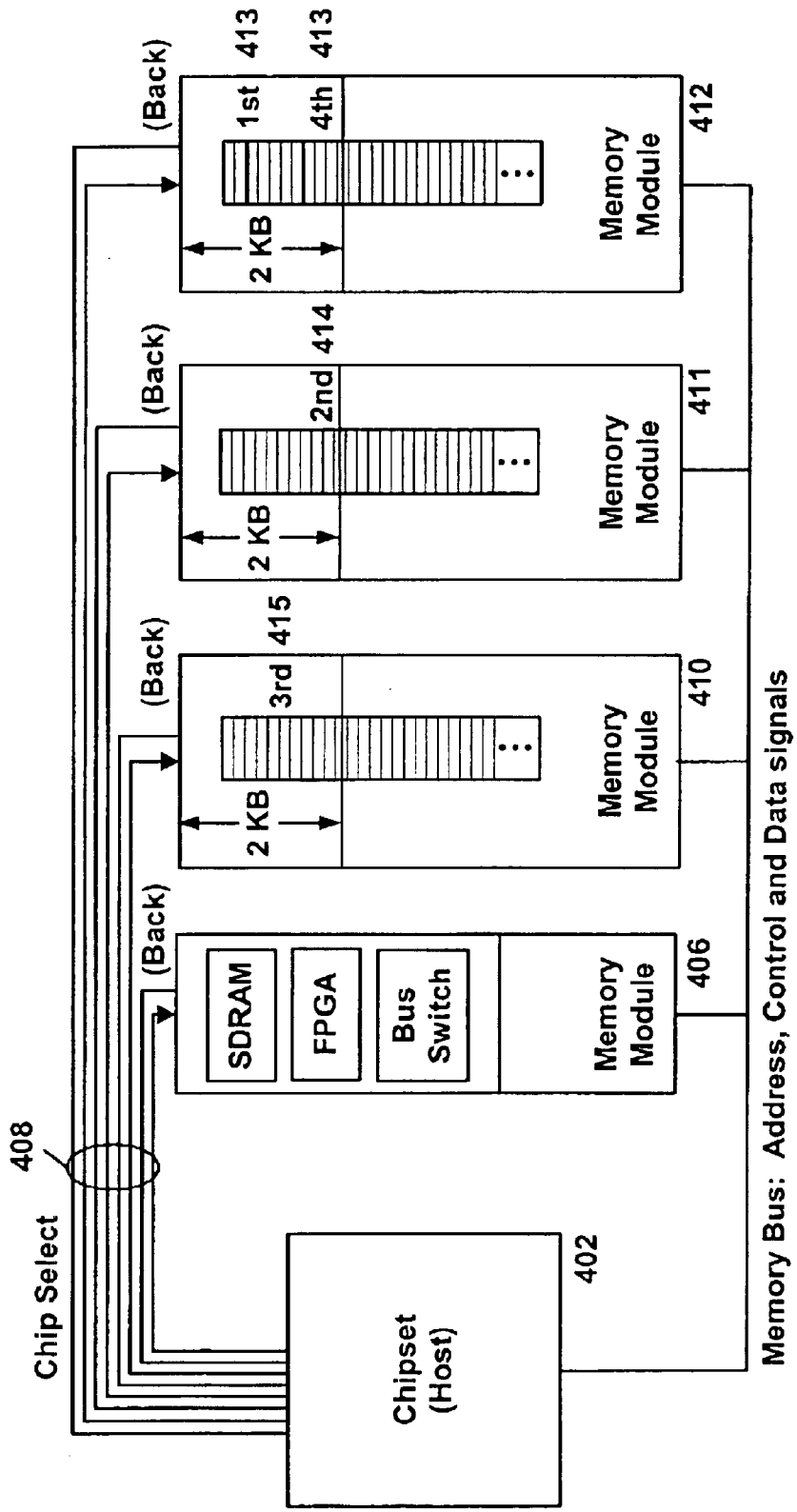
FIG. 4 provides an illustration of example address locations utilized in a sequential address call used for triggering a 'Get Bus' command under principles of the present invention.

FIG. 4 provides an illustration of example address locations utilized in a sequential address call used for triggering a 'Get Bus' under principles of the present invention. In one embodiment, the host 402 initiates a 'Get Bus' command by writing to (or reading from) specific predefined memory address locations in a reserved region of off-board memory in a predefined sequence.

In one embodiment, to initiate the system during kernel and driver loading, in software at least 2 KB of memory is reserved (on some DIMM(s) 410, 411, 412 other than the apparatus 406) at a physical location on a 2 KB boundary. In one embodiment, the highest 1 MB is reserved under the apparatus' offset. In one embodiment, next, the reserved region of memory is set as 'uncachable,' so that writes to it will be immediately executed.

In one embodiment, because the apparatus 406 is blind to the chip select 408, it does not know to which DIMM 410, 411, 412 the host's given address is referring. Therefore, in one embodiment, the distinguishing characteristic between address calls is the depth into the reserved region, regardless of to which DIMM 410, 411, 412 the call was intended. As stated previously, it does not matter if the sequence of address calls are to just one DIMM 410, 411, 412 or if they are to multiple DIMMs 410, 411, 412.

In a hypothetical sequence of address calls in one embodiment, a first memory call 413 is made to a specific address in the third DIMM 412. In one embodiment, a second memory call 414 is then is made to a specific memory address in the second DIMM 411, and then a third memory call 415 is made to a specific location in the first DIMM 410. Lastly, in one embodiment, the fourth memory call 416 is made to a specific location in the third DIMM 412. Upon perceiving the complete sequence, the apparatus 406 performs the switch. As explained below, in one embodiment of the present invention, the apparatus is tolerant of some number of spurious interim values in the command sequence. Therefore, a certain number, 'N', of 'non-relevant' data values may exist between 'relevant' data values without preventing command sequence recognition.

As stated previously, in one embodiment, all of the address calls for this sequence could have been directed to the same DIMM 410,411,412 without affecting the result. The only difference would be which chip select 408 is enabled. Because the apparatus 406 is blind to the chip selects 408, there would be no change to the result. The same sequence of address calls would cause the 'Get Bus'.

Figure 5:
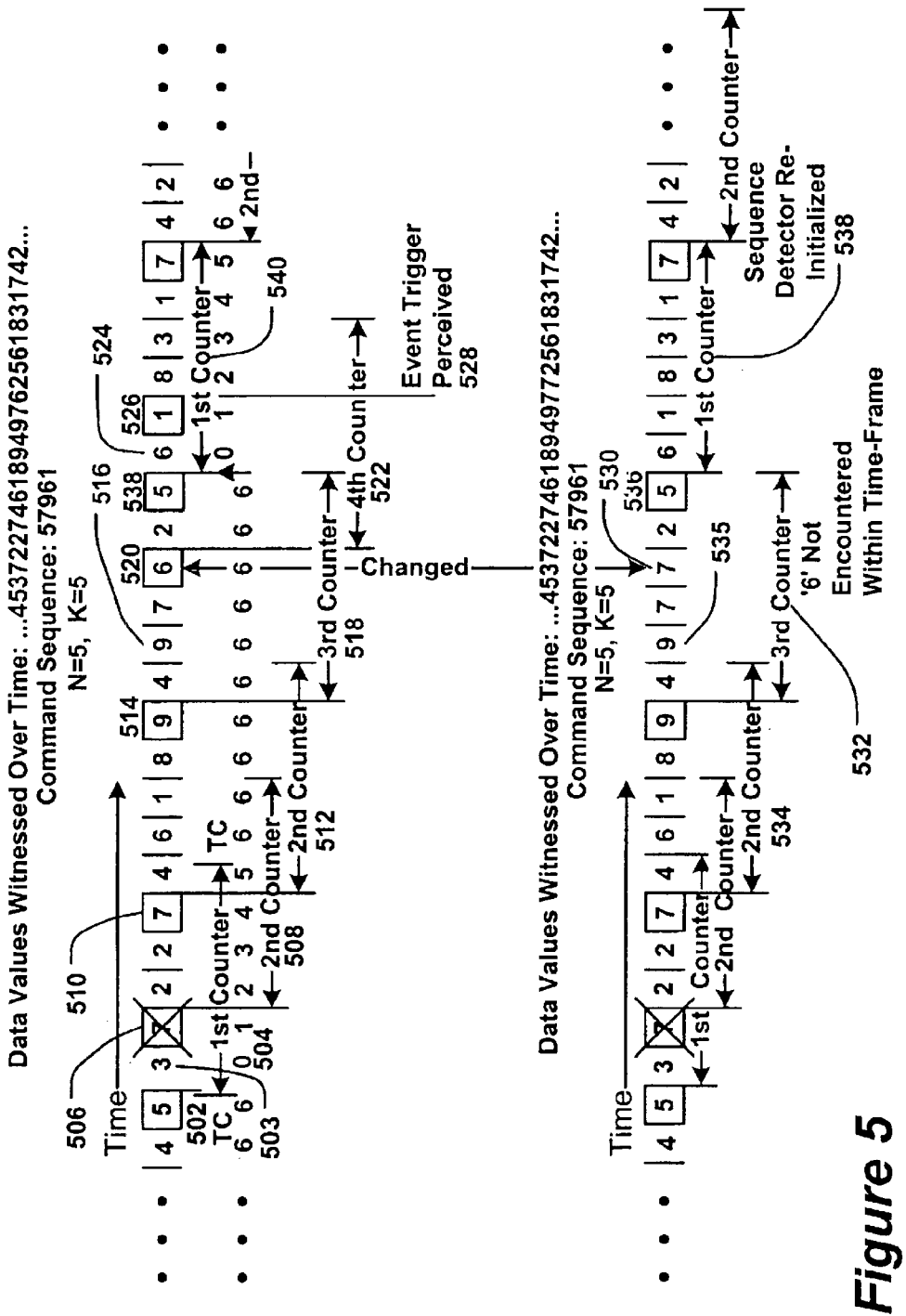
FIG. 5 provides a time chart illustrative of data value sequence detection utilizing a predefined amount of tolerance for spurious data between terms, under principles of the present invention.

FIG. 5 provides a time chart illustrative of data value sequence detection utilizing a predefined amount of tolerance for spurious data between terms, under principles of the present invention. For illustrative purposes, a string of simple decimal values and an 'N' value of 5 are provided for one embodiment. In one embodiment, an 'N' value of 62 is sufficient. Further, a value, 'K', is given representing the number of terms in the command sequence. In FIG. 5, 'K' equals 5.

In one embodiment, the data value sequence detector observes a string of data values (address calls, etc.) pass on the memory bus. In one embodiment, the detector looks for a specific sequence, '57961' for example, of data values (address calls) to trigger some event ('Get Bus'). In one embodiment, upon recognizing the first value 502 in the sequence, '5', a first counter 504 resets to zero in the cycle 503 after recognizing the first value 502, and thereafter increments by one each cycle until it reaches N+1=6. The apparatus encounters next a '3'. Because this data value is not a '7', which is required as the next value in the command sequence, the value is ignored. Next, in one embodiment, the apparatus encounters a '7'. Encountering the second value in the command sequence before the expiration of the first counter 504 (before the first counter reaches 'N+1=6'), a second counter 508 resets and begins to increment up to 'N+1=6' with each clock tick. In one embodiment, the apparatus now looks for either a repeat of the second value in the sequence before the expiration of the first counter or the third data value in the sequence before the termination of the second counter. The apparatus next sees two '2's in a row and then a '7'. Because the '7' is a repeat of the second data value in the sequence, and it is found before the expiration of the first counter 504, the second counter is reset 512 and its incrementation is restarted. This is to allow for the possibility that the first occurrence of the '7' was a spurious value. If the tolerance was not provided in such a manner, the window for a subsequent value in the command sequence could be detrimentally affected. In one embodiment, this repeat of the second data value 510 (before the expiration of the first counter 504) effectively replaces the first occurrence of the second data value 506.

In one embodiment, the apparatus next encounters a '4'. This value is not needed in the sequence, and so it is ignored. In the next cycle, the first counter terminates (reaches 'N+1=6'). At this point, in one embodiment, the apparatus can no longer accept a repeat second data value ('7'). The apparatus looks for the third data value, '9', to be encountered before the expiration of the second (restarted) counter 512. In one embodiment, '9' 514 is encountered after '6', '1', and '8'. Because it is encountered before the expiration of the second (restarted) counter 512, it is accepted.

In one embodiment, a '4' and then a '9' (repeat) 516 are encountered. Because the repeat '9' 516 is seen after the termination of the second (restarted) counter 512, it cannot be utilized to reset the third counter 518 (a sequence value cannot be taken during the last cycle of a counter, 'N+1=6'). In one embodiment, the apparatus next seeks a '6' and finds it 520 after a '7'. In one embodiment, because the '6' is found before the termination of the third counter 518, a fourth counter 522 is reset and its incrementation begun. A '6' 524 is encountered again after a '2' and an '8' but is not used to restart the fourth counter 522 because it is found after the expiration of the third counter 518. In one embodiment, the apparatus next finds the final value in the command sequence, the '1' 526. In one embodiment, upon recognition of the '1', the command sequence has been received within allowed tolerances, and thus the event trigger ('Get Bus') is perceived by the apparatus 528.

If one term of the same string provided is changed in one embodiment such that, where the apparatus encountered the '6', the '6' is replaced with a '7' 530, a different result would be yielded. Up to that point in the sequence recognition of the apparatus, everything would be the same. However, during the time span provided by the third counter 532, no '6' would be encountered. A '9' 535 is encountered again during the second tick of the third counter, but it cannot be utilized to restart the third counter 532 because at that point the second counter 534 has just terminated. Therefore, the command sequence is not recognized within the prescribed tolerance ('N'=5). In one embodiment, upon termination of the third counter 532, without encountering a repeat of the '9'(before termination of the second counter 534) or a '6' (before termination of the third counter 532), that potential sequence detection is abandoned. However, a '5' had already been found at this point 536, which restarted the first counter 538, and thus, the process is already in progress (in parallel).

Figure 6:
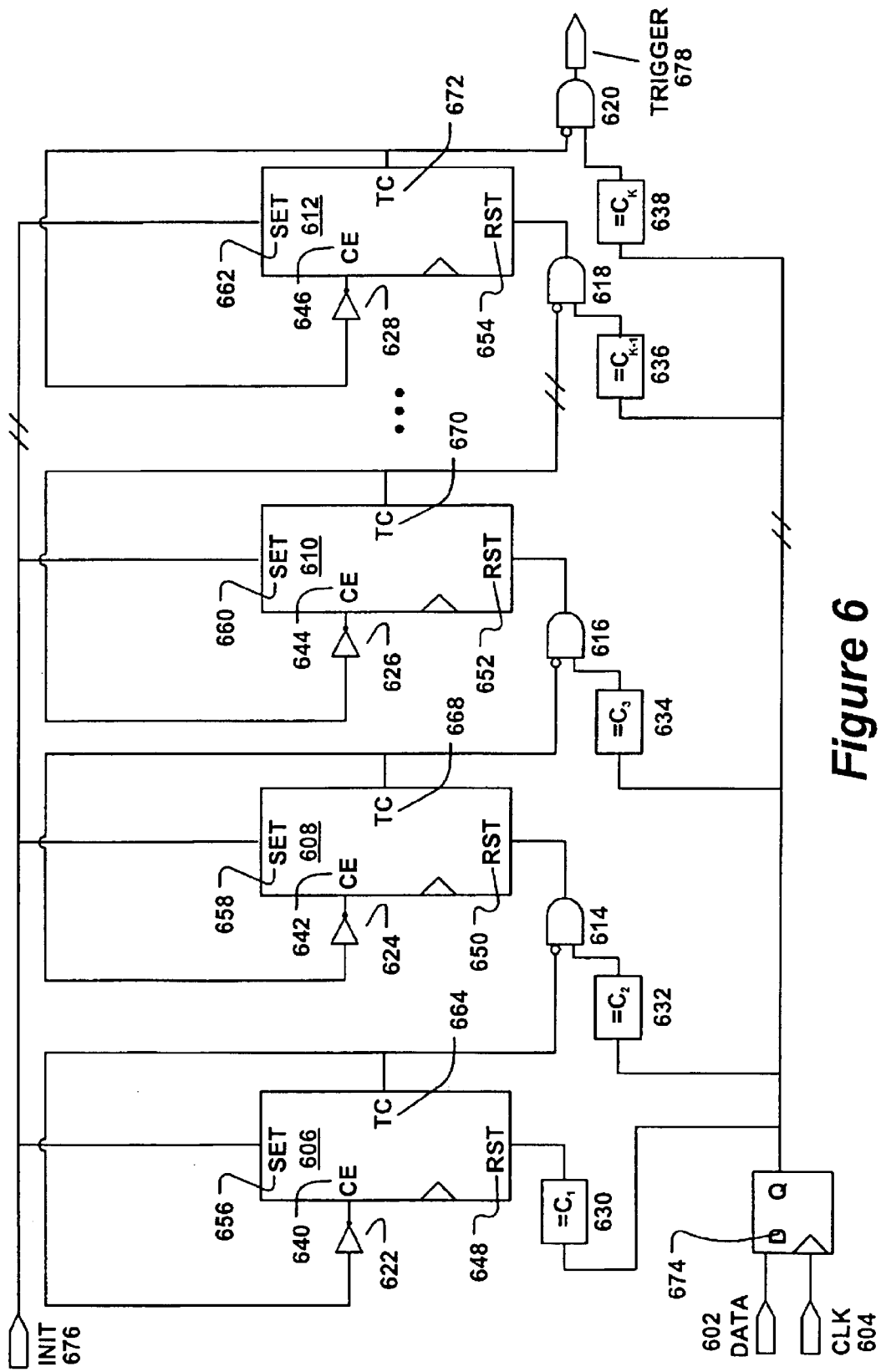
FIG. 6 provides a general schematic of the data value sequence detector under principles of the present invention.

FIG. 6 provides a general schematic of the data value sequence detector under principles of the present invention. In one embodiment, the sequence detector searches for a command sequence of 'K' values. In one embodiment, the input data 602 is registered before use by the detector on an appropriate clock edge 604. Although not shown in FIG. 6, the other synchronous components of the detector, the counters 606, 608, 610, 612, use the same clock 604.

In one embodiment, the detector uses, in addition to the AND gates 614, 616, 618, 620 and inverters 622, 624, 626, 628 shown, K comparators 630, 632, 634, 636, 638 and K−1 counters 606, 608, 610, 612. The comparators, one for each element of the command sequence $C_1, C_2, \ldots, C_K$, output '1' when the registered data matches the corresponding command sequence entry. In one embodiment, each counter 606, 608, 610, 612 counts synchronously upwards by 1 from 0 to N+1, wrapping around to 0, while its CE (Counter Enable) input 640, 642, 644, 646 is high. In one embodiment, each counter 606, 608, 610, 612 synchronously sets to N+1 when its SET input 656, 658, 660, 662 is high (regardless of CE) and outputs TC=1 (Terminal Count) 664, 668, 670, 672 when it holds the terminal count (N+1). In one embodiment, the counters' contents (current incrementation state) are not used in the detector, and therefore, are not illustrated as output signals from the counters 606, 608, 610, 612.

In one embodiment, the process of command sequence detection begins by asserting INIT (Initialize) 676 for one clock cycle. In one embodiment, in the next cycle, all K−1 counters 606, 608, 610, 612 will contain their terminal counts of N+1, and will output TC=1 664, 668, 670, 672. In one embodiment, since the CE input 640, 642, 644, 646 of each counter is the inverse of its TC output 664, 668, 670, 672, each counter will remain at N+1 and output TC=1 until it is reset via its RST (reset) input 648, 650, 652, 654.

In one embodiment, as long as the first element of the command sequence, $C_1$ 630, does not get registered (by the first comparator 630), nothing in the detector will change. When $C_1$, is registered, the first counter 606 will reset to 0 in the next cycle, consequently making its output TC=0 664. In one embodiment, this first counter 606 will then advance by 1 each following clock cycle and will stop at its terminal count of N+1 in N+1 cycles. In one embodiment, if, before the first counter 606 terminates, the second element, $C_2$, of the command sequence gets registered 632, then the second counter 608 will be reset 650 and begin its count from 0 to N+1. If this continues, i.e., each entry $C_3, C_4, \ldots, C_K$ of the command sequence appearing within N+1 cycles of the preceding entry, then the rightmost comparator (=$C_K$) will output a '1' while the rightmost counter is still showing TC=0, and TRIGGER 678 will be asserted. In one embodiment, at this point, optionally, INIT 676 may be asserted again to reset the detector.

In one embodiment, any counter 606, 608, 610, 612 holding less than N+1 may be reset by additional detection (s) of the corresponding command sequence element, provided that the counter to its left (if any) has not yet terminated. In this manner, when two or more instances of a command sequence element both occur within N+1 cycles of the preceding command sequence element, the later one is treated as a potential member of a legitimate triggering sequence, and the other(s) are treated as intervening spurious data.

In one embodiment, if the $n^{th}$ counter from the left is outputting TC=0, the detector has seen the first n terms of the command sequence (interleaved with a permissible amount of spurious data) and is looking for the next term. However, in one embodiment, at a time when the $n^{th}$ counter 606, 608, 610, 612 is outputting TC=0 664, 668, 670, 672 the first counter 606 (which may have since reached its terminal count) may still be reset by a new occurrence of $C_1$, leading to a parallel detection of another possible triggering sequence. This is illustrated in FIG. 5. The second occurrence of '5' 538 restarts the first counter 540 even though the first sequence detection has not completed yet 504, 508, 512, 518, 522. (See FIG. 5). In one embodiment, if it turns out that the data sequence which managed to reset the $n^{th}$ counter was just spurious data, the detector will thus not be fooled—a 'real' triggering sequence starting in the middle of a 'fake' triggering sequence will have every opportunity to trigger the detector.

In one embodiment, the structure of this detector is necessary to unfailingly detect triggering sequences comprised of the command sequence with up to N intervening spurious values between consecutive terms. In one embodiment, K−1 counters 606, 608, 610, 612 may be sufficient. It may be necessary that the detector be able to consider K−1 possible triggering sequences simultaneously.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system comprising:
a first device to detect a predetermined sequence of relevant data values indicating an event triggering command within a string of data values, said string of data values including said relevant data values and a number of non-relevant data values, wherein said predetermined sequence of relevant values is detected only if said string of data values includes no more than a finite nonzero number 'N' of non-relevant data values between any two sequential relevant data values.

2. The system of claim 1, further comprising a tap line to communicate said string of data values between a signal line and said first device.

3. The system of claim 2, wherein the event comprises a switching between a communication path between the first device and a second device and a communication path between the signal line and the second device.

4. The system of claim 3, wherein the first device is a logic device, the second device is a memory device, and said data values are memory addresses.

5. The system of claim 4, wherein the logic device is a Field Programmable Gate Array (FPGA).

6. The system of claim 4, wherein the memory device is Synchronous Dynamic Random Access Memory (SDRAM).

7. The system of claim 1, wherein said command is detected by a data value sequence detector.

8. The system of claim 7, wherein said detector includes a plurality of value sequencing units.

9. The system of claim 8, wherein each value sequencing unit includes at least one comparator communicatively coupled to at least one counter.

10. The system of claim 9, wherein each value sequencing unit is associated to a different relevant data value in the sequence of relevant data values.

11. The system of claim 10, wherein upon recognition of a first relevant data value in the sequence, by a first value sequencing unit associated to a first relevant data value, an associated first counter is to reset and then progress one counter state for each of a plurality of clocking signals, until 'N+2' counter states have passed by said first counter.

12. The system of claim 11, wherein, upon recognition of a second relevant data value, by an associated second value sequencing unit, before said first counter passes 'N+2' counter states, said second counter is to reset and then progress one counter state for each of said clocking signals, until 'N+2' counter states have passed by said second counter.

13. The system of claim 12, wherein, upon recognition of a third relevant data value, by an associated third value sequencing unit, before said second counter passes 'N+2' counter states, said third counter is to reset and then progress, one counter state for each of said clocking signals until 'N+2' counter states have passed by said second counter.

14. The system of claim 12, wherein upon recognition of a last relevant data value in the sequence after sequential recognition of all other relevant data values, the event-triggering command is to be detected.

15. A computer implemented method comprising:
detecting a predetermined sequence of relevant data values indicating an event triggering command within a string of data values, said string of data values including said relevant data values and a number of non-relevant data values, wherein said predetermined sequence of relevant values is detected only if said string of data values includes no more than a finite nonzero number 'N' of non-relevant data values between any two sequential relevant data values.

16. The method of claim 15, wherein a tap line is to communicate said plurality of data values between a signal line and said first device.

17. The method of claim 16, wherein the event includes a switching between a communication path between the first device and a second device and a communication path between the signal line and the second device.

18. The method of claim 17, wherein the first device is a logic device, the second device is a memory device, and said data values are memory addresses.

19. The method of claim 18, wherein the logic device is a Field Programmable Gate Array (FPGA) and the memory device is Synchronous Dynamic Random Access Memory (SDRAM).

20. The method of claim 15, wherein said command is detected by a data value sequence detector.

21. The method of claim 20, wherein said detector includes a plurality of value sequencing units.

22. The method of claim 21, wherein each value sequencing unit includes at least one comparator communicatively coupled to at least one counter.

23. The method of claim 22, wherein each value sequencing unit is associated to a different relevant data value in the sequence of relevant data values.

24. The method of claim 23, wherein upon recognition of a first relevant data value in the sequence, by a first value sequencing unit associated to a first relevant data value, an associated first counter resets and then progresses, one counter state for each of a plurality of clocking signals, until 'N+2' counter states have passed by said first counter.

25. The method of claim 24, wherein, upon recognition of a second relevant data value, by an associated second value sequencing unit, before said first counter passes 'N+2' counter state, said second counter resets and then progresses, one counter state for each of said clocking signals, until 'N+2' counter states have passed by said second counter.

26. The method of claim 25, wherein, upon recognition of a third relevant data value, by an associated third value sequencing unit, before said second counter passes 'N+2' counter states, said third counter resets and then progresses, one counter state for each of said clocking signals until 'N+2' counter states have passed by said second counter.

27. The method of claim 25, wherein upon recognition of a last relevant data value in the sequence after sequential recognition of all other relevant data values, the event-triggering command is perceived.

28. A system to perceive an event-triggering command, by a logic device, the system comprising:
a signal line to communicate a plurality of memory addresses between a host and one or more second devices; and
a logic device coupled to said signal line to detect a predetermined sequence of relevant memory addresses indicating the event triggering command within a string of memory addresses on said signal line, said string of memory addresses including said relevant memory addresses and a number of non-relevant memory addresses, wherein said predetermined sequence of relevant values is detected only if said string of memory addresses includes no more than a finite nonzero number 'N' of non-relevant memory addresses between any two sequential relevant memory addresses.

29. The system of claim 28, wherein the event comprises a switching between a communication path between the logic device and a memory device and a communication path between the signal line and the memory device.

30. The system of claim 29, wherein the logic device is a Field Programmable Gate Array (FPGA) and the memory device is Synchronous Dynamic Random Access Memory (SDRAM).

* * * * *